Dec. 19, 1967  D. G. SMITH  3,358,300
MOUNTING AND SUPPORTING APPARATUS FOR LITTERS
Filed May 23, 1966  2 Sheets-Sheet 1

INVENTOR.
DONALD G. SMITH
BY George Sullivan
Agent

Dec. 19, 1967 D. G. SMITH 3,358,300
MOUNTING AND SUPPORTING APPARATUS FOR LITTERS
Filed May 23, 1966 2 Sheets-Sheet 2
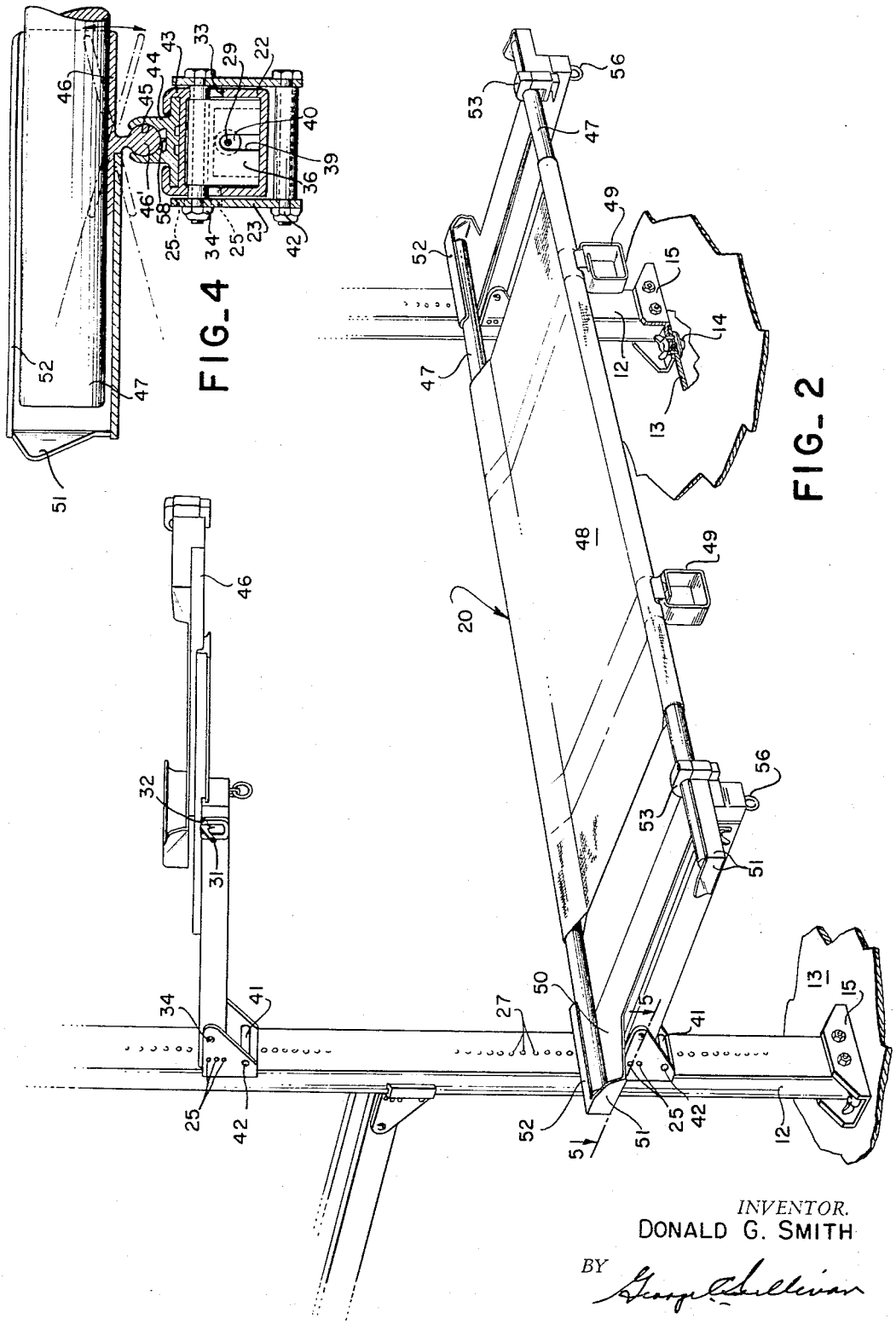
INVENTOR.
DONALD G. SMITH
BY George Sullivan
Agent

United States Patent Office 3,358,300
Patented Dec. 19, 1967

3,358,300
MOUNTING AND SUPPORTING APPARATUS
FOR LITTERS
Donald G. Smith, Marietta, Ga., assignor to Lockheed
Aircraft Corporation, Burbank, Calif.
Filed May 23, 1966, Ser. No. 552,229
8 Claims. (Cl. 5—9)

ABSTRACT OF THE DISCLOSURE

A method is presented for supporting litter patients during air transit by which total access is facilitated to assure maximum attending, nursing, etc. It consists of quick-erectable, stanchion pairs, having vertically adjustable cantilever arms that are extendible and configured to restrain and support standard litters, at a level or longitudinally tilted attitude. Novel features include a latch system that permits single attendant operation and quick patient access.

This invention relates to litter installations and more particularly to a mounting and supporting apparatus for litters especially useful on board vehicles whereby improved patient access and attendant mobility is obtained without a decrease in the number of litters being accommodated.

The present invention has in view an improved mounting and supporting apparatus for litters that greatly simplifies the installation and manipulation thereof requiring a minimum of attendant's time and effort. At the same time, this apparatus allows for human factor considerations that preclude awkward handling positions by, and increases safety to, attending personnel as well as adds comfort to the patients.

While the apparatus herein proposed has general application and utility, it offers particular advantages when employed on vehicles such as aircraft especially adapted for so-called "ambulance" missions. These aircraft are basically cargo transports, the storage area of which is lined with bunks or cots to accommodate the sick and injured to be carried thereby. It is desirable that such aircraft are readily convertible to their general cargo missions and the bunk or litter installations are therefore removably anchored therein in tiers to most economically use the space available. Necessarily, these installations must be designed and constructed to a good strength to weight ratio and to permit rapid on-and-off loading.

In addition, with the increased duration of present day rescue and mercy flights, considerably more patient attention such as medicating, feeding, dressing changes and general body care is required on board than has been in the past. Such operations are more aptly termed "hospital" rather than "ambulance" missions requiring larger medical staffs which can only be held to practical numbers by decreasing the workload and the time required to accomplish the simple basic tasks.

The instant invention is, therefore, primarily directed to a litter installation for vehicles that is of the knock-down or easily removable type permitting a maximum number of patient accommodations with maximum access to each patient by on-board attendants. The workload both in terms of time and manual effort on the part of the attendant or attendants is thereby reduced.

To the above ends, a mounting and supporting apparatus is herein contemplated that is demountably installed within the vehicle's storage area or cargo compartment and which includes multiple cantilevered frames disposed in tiers. Thus disposed in fore and aft rows, the frames establish and define aisleways having a width adequate for free attendant passage and mobility. Each such frame is adapted to receive and engage a conventional litter or stretcher and is extensible and retractable laterally into the associated aisleway giving virtually total access on all sides thereof. Within predetermined limits each frame is also adjustable vertically, as well as tiltably, adjacent its opposite ends to permit angular disposition of the patient thereon.

Controls are provided to lock and unlock each frame in either a selected, extended or a retracted position and also a selected, vertical and/or tilted position with the actuating means therefor located adjacent the aisle. This facilitates movement and manipulation of the frame, particularly with a stretcher or litter and patient thereon. In addition, each frame is provided with an adjustable connector to secure it to the vehicle in a preselected range of angular positions. This assures, for example, a horizontal position of the litter regardless of the angularity of the support for the frame as dictated by the contour of the vehicle where maximum use of the compartment is to be obtained.

With the above and other objects in view as will be apparent, this invention consists in the construction, combination and arrangement of parts all as hereinafter more fully described, claimed and illustrated in the accompanying drawings wherein:

FIGURE 2 is an isometric view of a fragment of the mounting and supporting apparatus showing one of the frames with litter installed disposed in the fully retracted position and the arm of an adjacent frame disposed in the fully extended position;

Figure 3:
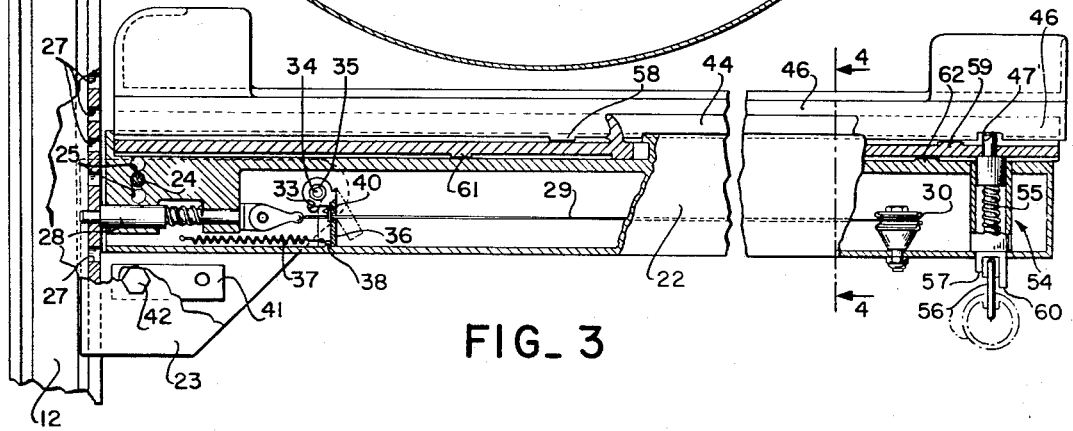
FIGURE 3 is a side view of the fully retracted arm shown in FIGURE 2 with parts broken away to reveal primarily the releasable lock mechanisms to secure it in any of the selected positions, both vertically and horizontally, and the remotely controlled actuating means therefor.
Figure 5:
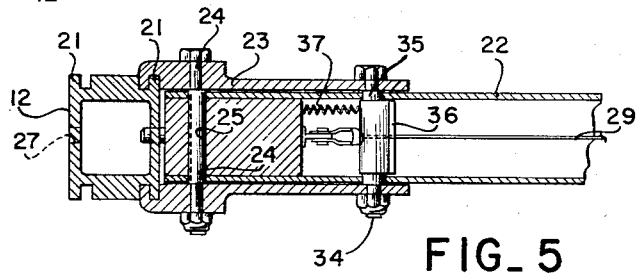

FIGURE 4 is a section taken along line 4—4 of FIGURE 3 to show primarily the actuating means for the lock to secure the arm in the selected vertical position, the degree of movement of the arm corresponding to the tilted position being indicated by an arrow; and FIGURE 5 is a section taken along line 5—5 of FIGURE 2 to show primarily the means by which the movement of each arm is controlled during its vertical adjustment and all lateral movement thereof prevented.

Referring with greater particularity to the drawings, 10 designates generally an aircraft or a major component thereof such as the fuselage having an internal compartment 11 adapted to carry and transport various cargo. In order to give this aircraft 10 ambulance capabilities, the walls are provided with suitable fittings or attachment means complemental to connectors carried by stanchions 12 which are thereby removably installed within the compartment 11. For this purpose, the floor or deck 13 of the compartment 11 may be provided with means, such as anchor nuts 14, located at predetermined places in the floor 13 each adapted to removably secure a fitting 15 carried by the lower end of a stanchion 12.

The opposite wall or ceiling 16 of the compartment 11 may be provided with corresponding localized sockets 17 adapted to receive a ball fitting 18 carried by each stanchion 12 and mounted for telescopic movement therein. A compression spring 19 associated with this end of each stanchion 12 serves to constantly force the ball fitting 18 outwardly thereof whereby it is retained in its associated socket 17. An appropriate number of stanchions 12 are thereby disposed within the compartment 11 and maintained in a fixed upright or vertical position.

Each pair of adjacent stanchions 12 thus disposed cooperate one with the other to support a cantilevered frame for a standard or conventional stretcher or litter 20. To this end, each stanchion 12 is flanged, as at 21, at and along one side thereof to form track and guide means to receive and accommodate a corresponding slide carried by a litter support arm 22 through a bracket 23 secured thereto by a bolt 24. Each bracket 23 is pierced by a series of aligned holes 25 adjacent its inner end, any set of which is adapted to align with a hole piercing the associated arm 22 and coact therewith to receive the bolt 24 whereby the angular position of the arm 22 with respect to its stanchion 12 may be adjusted within a preselected range. This permits compensation for a cant (indicated by the arrow brackets, FIGURE 1) of the stanchion 12 where necessary in order to appropriately secure it within the compartment 11 and position the arms 22 carried thereby horizontal with respect to the deck 13.

Each stanchion 12 is pierced at and along the face of its flanged side 21 by a series of apertures 27 adapted to coact with a spring-loaded plunger element 28 carried by each arm 22. The position of each arm 22 with respect to the stanchion 12 is thereby selectively located and maintained whereby the height of the litter 20 supported thereby may be adjusted. An actuating cable 29 connected to the outer end of each plunger 28 passes around a pulley 30 carried by the associated arm 22 adjacent the outer end thereof and terminates in a trigger 31 pivotally mounted, as at 32, on the arm 22 adjacent its outer end. Rotation of the trigger 31 thus serves to lock and unlock its plunger 28 for operation of each arm 22 vertically on its stanchion 12. To facilitate this arrangement, each arm 22 is formed in a hollow box shape with an opening for the passage of the cable 29 therethrough and connection of the trigger 31 mounted externally thereof.

In order to assure the position of each arm 22 as a cantilever under full load and at the same time to facilitate its sliding adjustment on its stanchion 12 as described each arm 22 is connected to its bracket 23 at the outer end thereof remote from the bolt 24. To this end, a pair of aligned holes pierce the arms of each bracket 23 and slots 33 in the adjacent sides of the arm 22 permit the passage therethrough of a pin 34. The slots 33 extend in a generally vertical direction, i.e., substantially parallel to the stanchions 12, permitting each arm 22 to pivot to a limited extent about its bolt 24. The pins 34, however, are each normally maintained in a fixed position at the upper end of its slot 33 by a sleeve 35 and tangentially disposed plate 36 rotatably mounted on the central portion of the pin 34 located within the arm 22. This position is effected by means of and through a tension spring 37 connected to the outer end of each plate 36 and acting in opposition to a fixed stop 38 carried by the arm 22.

A cutout 39 in the plate 36 permits the passage of the cable 29 therethrough an an enlargement 40 on the cable 29 adjacent the plate 36 to act in opposition to the normal action of the spring 37 serves to move the plate 36 upon actuation of the trigger 31. This unlocks the plunger 28 from the stanchion 12, freeing the arm 22 to pivot about the bolt 24 so that any tendency of the track and guide means effected by the flange 21 and bracket 23 to bind is eliminated. When the height adjustment of the arm 22 is completed and the trigger 31 released to permit the plunger 28 to lock, the pin 34 is returned to its fixed position at the end of slot 33 under the normal action of its spring 37.

In addition a relatively large surface area is provided between the track and guide means 21 and 23 by an extension of each bracket 23 below the associated arm 22. A spacing block 41 disposed between the extended portions of each bracket 23 and maintained in position by suitable fasteners 42 adds structural integrity to the entire assembly.

The upper side of each arm 22 is formed or otherwise provided with a track 43 constituting a slide for a complemental extension arm 44 on the support arm 22. The upper surface of extention arm 44 is grooved, as at 45, to receive and secure therein in sliding relation a complementary extension 46′ on a litter support beam 46. Thus the telescoping movement of each litter beam 46 relative to its slide arm 44 and similar movement by such slide arm 44 relative to its support arm 22 permits the extension and retraction of the litter bearing frame with respect to its stanchion 12.

The stretcher 20 is the standard type presently in service and essentially consists of a pair of poles 47 disposed in parallel, coextensive relation and interconnected through a sheet 48 of fabric, such as canvas, forming, when the poles 47 are apart, a flexible body support or cot for a patient resting thereon. Suitable rests or feet 49 secured to each pole 47 support the cot or litter on a surface.

The length of each beam 46 is substantially equal to the transverse dimension of the sheet 48 as defined by the poles 47 when apart and the location of adjacent stanchions 12 is made to correspond substantially to the length of the litter 20 as defined by the length of the poles 47.

The ends of the litter poles 47 thereby rest upon opposite ends of the corresponding litter beams 46 and terminate at the sides thereof, the end portions of each beam 46 being enlarged, as at 50, to provide additional support area therefor. Moreover, a flange 51 defines the outer edges of such beam 46 to contain the associated litter pole 47 with the flange 51 associated with the end of the beam 46 adjacent stanchion 12 being formed or otherwise provided with a lip 52. This lip 52 defines an inner surface which conforms to that of the associated pole 47 which is thus received and retained thereby and held against virtually all relative movement once disposed therein. The outer end of each beam 46 may be provided with a conventional toggle clamp 53 pivotally mounted thereon to secure the associated litter pole 47 when resting on the adjacent enlarged portion 50.

In view of the foregoing construction and arrangement, it is apparent that the stanchions 12 may be arranged in pairs as desired within the compartment 11 to establish the predetermined number of litter rows. In the arrangement shown in FIGURE 1 one such line of stanchions 12 is disposed adjacent each side of the fuselage 10 and a central row of stanchions 12 runs longitudinally of the fuselage 10. The central row of stanchions 12 is adapted to mount the desired number of litter tiers on each side whereby four rows of litters and two aisleways A result. With the stanchions 12 thus sceured in position, the coacting pairs of arms 22 are slidably positioned on the stanchions 12 through their track and guide means 21 and 23 and the relative height is located and maintained by operation of the lock or plunger 28 associated with each arm 22. Thus, the desired number of tiers is established, and the aircraft 10 is ready to receive a corresponding number of litters 20, each accommodating a patient thereon.

With an attendant at each end of a litter, the poles 47 are placed upon the support beam 46 and the pole to be disposed adjacent the stanchions 12 is placed at each end under the adjacent lip 52 whereupon the other pole may be disposed against the flange 51 at the outer end of each beam 46. If it is desired to further adjust the height of a litter 20, an attendant at either end thereof may release that arm 22 by actuating the trigger 31 and reposition the arm 22 at the desired height by location of its plunger 28 in a selected aperture 27. If it is desired to dispose the patient at an angle relative to horizontal, only one end of the litter 20 is thus adjusted accordingly. To facilitate these height adjustments of one or both ends of the litter 20, the groove 45 and beam extension 46′ of each arm 22 is circular in section to permit a predetermined angular displacement of each beam 46 as indicated generally by the arrow, FIGURE 4.

With a patient disposed on the litter 20, the litter is further secured against any movement by means of and through a lock mechanism 54. This lock mechanism comprises a spring-loaded plunger 55 with an actuating handle such as ring 56 mounted on the outer end of each arm 22 and adapted to pass vertically through arm 22, slide beam 44 and into a notch 47' in the depending extension 46' on beam 46 when the beam 46 is fully telescoped within the arm 22. With the lock thus engaged, the telescoping arm assembly 22, 44, and 46 is held in a fixed contracted position.

In order to gain access to a patient on the litter 20, the lock mechanism 54 may be released by actuation of the plunger 55 whereby the beam support 46 is extended and the litter 20 located in the adjacent aisleway. Thus the arm assembly 22, 44, and 46 may be partially extended as shown at P in FIGURE 1. In this case, the plunger 55 is retracted by a pull of the ring 56 followed by a slight rotation thereof (approximately 45°) whereupon the ring 56 engages a shoulder 57 provided on the end of the casing of the plunger 55. The plunger is thereby held in a retracted position allowing the beam 46 to be extended until a stop 58 depending therefrom strikes an upstanding stop 59 on the slide beam 44.

Figure 1:
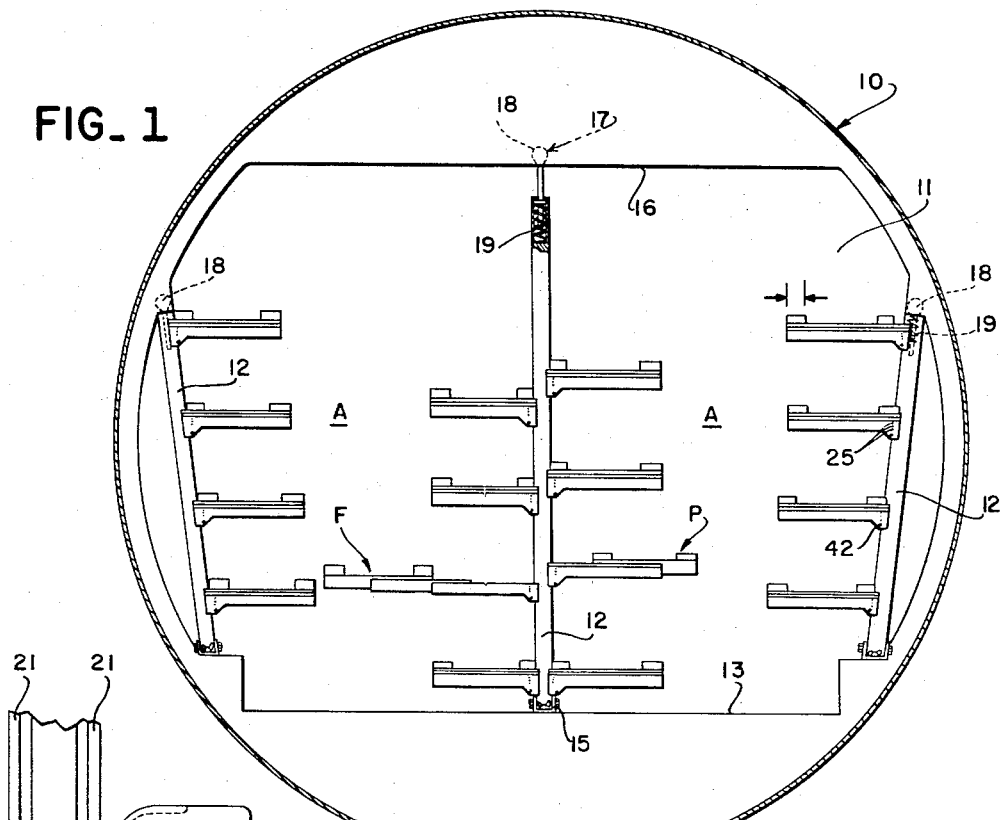
FIGURE 1 is a diagrammatic cross-sectional view taken through a vehicle such as an aircraft in which mounting and supporting apparatus for litters constructed in accordance with the teachings hereof has been installed to show the general arrangement thereof, the individual litter-bearing frames being disposed in a variety of operative positions.

If it is desired to fully extend the arms 22 as shown at F in FIGURE 1, the plunger 55 is further retracted by a pull of the ring 56 and an additional rotation thereof (about 45°) whereupon the ring 56 engages a second shoulder 60 on the end of the casing of the plunger 55. The plunger 55 is thereby withdrawn from the passage through slide beam 44 and held in its fully retracted position allowing the beams 44 and 46 to be extended as a unit until a depending stop 61 thereon strikes a complemental upstanding stop 62 on the upper surface of the beam 22.

While one preferred embodiment of the invention has been herein illustrated and described, numerous modifications and variations thereof are possible in the light of the present teachings. It is therefore to be understood that this invention may be practiced otherwise than as specifically described, the limitations thereof being defined solely by the appended claims.

What is claimed is:

1. A mounting and supporting apparatus for litters comprising a stanchion, a cantilevered frame mounted on and projecting laterally of said stanchion, said frame defining a generally rectangular area and being extendible and retractable with respect to said stanchion, a sliding connection between said frame and said stanchion operative to adjust the position of said frame linearly on said stanchion, said connection including a pivot for limited rotation of said frame relative to said stanchion during the linear adjustment thereof as aforesaid, a stop operative concurrently with said lock to render said pivot inoperative, a lock to secure said frame in the adjusted position, and a releasable litter engagement carried by said frame and operative to secure a litter when disposed thereon against all relative movement.

2. The apparatus of claim 1 wherein said stanchion includes a pair of spaced uprights, each terminating in a fitting at its opposite ends for removable connection to associated structure to thereby form an immovable part thereof.

3. The apparatus of claim 1 including a variable connector between said frame and said stanchion including in addition to the pivot aforesaid a socket in which the frame can rotate about its own length relative to the stanchion whereby it is located at preselected angles in multiple planes relative thereto.

4. The apparatus of claim 2 including a sliding connection between each of said uprights and said frame, a lock associated with each said connection, and a series of engagements carried by each said upright for cooperation with the adjacent lock to retain the frame in a predetermined position.

5. The apparatus of claim 1 wherein said frame includes a pair of spaced, litter supporting beams, each mounting and supporting a pair of telescoping arms, and a lock mechanism to secure said arms in a selected one of multiple predetermined positions of extension and retraction.

6. The apparatus of claim 1 including a lock mechanism to secure said frame in predetermined positions of extension and retraction, and an actuator for said lock and said lock mechanism respectively carried by said frame remote from said stanchion.

7. The apparatus of claim 5 wherein each of said arms includes a pivotal connection at and along the length thereof to permit predetermined rotation thereof.

8. The apparatus of claim 5 wherein said telescoping arms each includes a support arm removably secured to said stanchion, and intermediate arm slidably mounted on said support arm, and a litter bearing beam slidably mounted on said intermediate arm.

References Cited

UNITED STATES PATENTS

| | | | |
|---|---|---|---|
| 1,263,918 | 4/1918 | Miller | 296—19 |
| 2,357,668 | 9/1944 | Leham | 108—143 X |
| 2,456,024 | 12/1948 | Schofield | 296—19 |
| 2,473,364 | 6/1949 | Dickenson et al. | 5—9 |
| 3,028,606 | 4/1962 | Boutet | 5—9 |
| 3,081,972 | 3/1963 | Graym | 108—106 X |

FOREIGN PATENTS

| | | |
|---|---|---|
| 944,690 | 12/1963 | Great Britain. |

CASMIR A. NUNBERG, *Primary Examiner.*